United States Patent
Chambers et al.

(10) Patent No.: US 7,659,813 B2
(45) Date of Patent: Feb. 9, 2010

(54) ASSET PERFORMANCE OPTIMIZATION

(75) Inventors: Gregory L. Chambers, Atlanta, GA (US); Kenneth Van Meter, Alpharetta, GA (US); Edward M. Smith, Alpharetta, GA (US); Patrick T. Golden, Canton, GA (US)

(73) Assignee: Prenova, Inc., Marietta, GA (US)

( * ) Notice: Subject to any disclaimer, the term of this patent is extended or adjusted under 35 U.S.C. 154(b) by 454 days.

(21) Appl. No.: 11/619,838

(22) Filed: Jan. 4, 2007

(65) Prior Publication Data

US 2007/0168050 A1   Jul. 19, 2007

Related U.S. Application Data

(60) Provisional application No. 60/757,446, filed on Jan. 9, 2006.

(51) Int. Cl.
G08B 23/00 (2006.01)

(52) U.S. Cl. ..................... 340/500

(58) Field of Classification Search ............. 340/572.1, 340/539.1, 539.22, 539.24, 500
See application file for complete search history.

(56) References Cited

U.S. PATENT DOCUMENTS

| | | | |
|---|---|---|---|
| 5,761,083 A | 6/1998 | Brown et al. | |
| 6,211,782 B1 | 4/2001 | Sandelman et al. | |
| 6,961,641 B1 | 11/2005 | Forth et al. | |
| 7,216,043 B2 | 5/2007 | Ransom et al. | |
| 2003/0171851 A1 | 9/2003 | Brickfield et al. | |
| 2003/0225483 A1 | 12/2003 | Santinato et al. | |
| 2005/0038571 A1 | 2/2005 | Brickfield et al. | |
| 2005/0275525 A1 | 12/2005 | Ahmed | |
| 2005/0278597 A1 | 12/2005 | Miguelanez | |
| 2006/0191275 A1 | 8/2006 | Jung et al. | |
| 2007/0005191 A1 | 1/2007 | Sloup et al. | |
| 2007/0038700 A1 | 2/2007 | Eryurek et al. | |
| 2007/0067656 A1 | 3/2007 | Ranganathan et al. | |

OTHER PUBLICATIONS

International Search Report and Written Opinion.
Chambers; U.S. Appl. No. 12/126,566, filed May 23, 2008. (Note: Copy not provided as it is a part of PTO records).
Chambers; U.S. Appl. No. 12/133,098, filed Jun. 4, 2008. (Note: Copy not provided as it is a part of PTO records).
Chambers; U.S. Appl. No. 12/126,556, filed May 23, 2008 (Note: Copy not provided as it is a part of PTO records).
European Search Report dated Oct. 13, 2008.
Clark, G., et al., "Artificial Intelligence and Networking in Integrated Building Management Systems," Automation in Construction, Elsevier Science Publishers, Amsterdam, NL, vol. 5, No. 506, Sep. 1, 1997, pp. 481-498.

*Primary Examiner*—Jeffery Hofsass
(74) *Attorney, Agent, or Firm*—Thomas, Kayden, Horstemeyer & Risley, LLP

(57) ABSTRACT

Included are embodiments for asset management. At least one embodiment of a method includes receiving, at a performance assessment and optimization center, data from at least one asset, the asset being configured to service an environment and performing at least one calculation, from the received data, to determine whether the asset is operating properly. Some embodiments include in response to a determination that the at least one asset is not operating properly, providing an indication related to operation of the asset.

20 Claims, 19 Drawing Sheets

/ 422

| | | |
|---|---|---|
| CLIENT NAME | DEMOCORP | |
| SITE NAME | 1234 PRENOVA HEADQUARTERS | |
| SITE ADDRESS | 5678 FAKE STREET | |
| SITE CITY, ST ZIP | MARIETTA, GA 30068 | |
| | | |
| ASSET ID | 741EC0A1-9938-4AF3-915D-74DEAD1C91A8 | |
| ASSET NAME | RTU-01 | |
| AREA SERVED | SALES FLOOR | |
| MAKE | TRANE | |
| MODEL | VOYAGER | |
| SERIAL # | 123456789 | |

| ORDER OF WORK | ITEM | PARTS NEEDED | PRIORITY |
|---|---|---|---|
| 1 | REPAIR/REPLACE SUPPLY AIR SENSOR | NOVAR SUPPLY SENSOR PART #NOVAR-1234 | MEDIUM |
| 2 | REPAIR ECONOMIZER DAMPER | N/A | HIGH |

FIG. 8

ASSET PERFORMANCE OPTIMIZATION

CROSS-REFERENCE TO RELATED APPLICATION

This application claims priority to copending U.S. provisional application entitled, "VIRTUAL AUDIT SYSTEM AND METHOD," having Ser. No. 60/757,446, filed Jan. 9, 2006, which is entirely incorporated herein by reference.

TECHNICAL FIELD

The present disclosure is related to an asset performance optimization system and method. More specifically, the present disclosure is related to communications with one or more assets associated with an environment.

BACKGROUND

Utilization of one or more assets, including but not limited to, heater systems, air conditioning systems, refrigeration systems, alarm systems, security systems, appliances, electronics, and/or other devices associated with an environment and/or business equipment may result in a large amount of energy consumed and associated asset repair service costs. As energy costs may become an increasingly large portion of a home's and/or business's budget, reduction of energy consumption and associated expenses may be desired. In an effort to reduce energy consumption and/or associated operating costs, many homes and/or businesses utilize control systems including, but not limited to, timers and other scheduling to automatically activate or deactivate one or more assets at predetermined times and operate equipment to defined business parameters. As these control systems may reduce energy usage, the systems are generally inflexible and may not effectively accommodate for continuing business changes to operations and schedules. Although this problem may be partially addressed by the inclusion of system parameter options and/or utilization of a customer service representative to reactively intervene, such solutions are generally difficult to utilize and often result in system ineffectiveness, which may introduce further problems. Control systems may, at times, be configured to track and manage certain parameters of individual unit performance, however, entire building system optimization of multiple units operating in tandem is, largely left unaddressed.

Thus, there is a heretofore unaddressed to overcome inefficiencies and shortcomings as described above.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 8 is an exemplary user interface illustrating a work order listing for one or more of the assets from FIG. 7.

DETAILED DESCRIPTION

Figure 1:
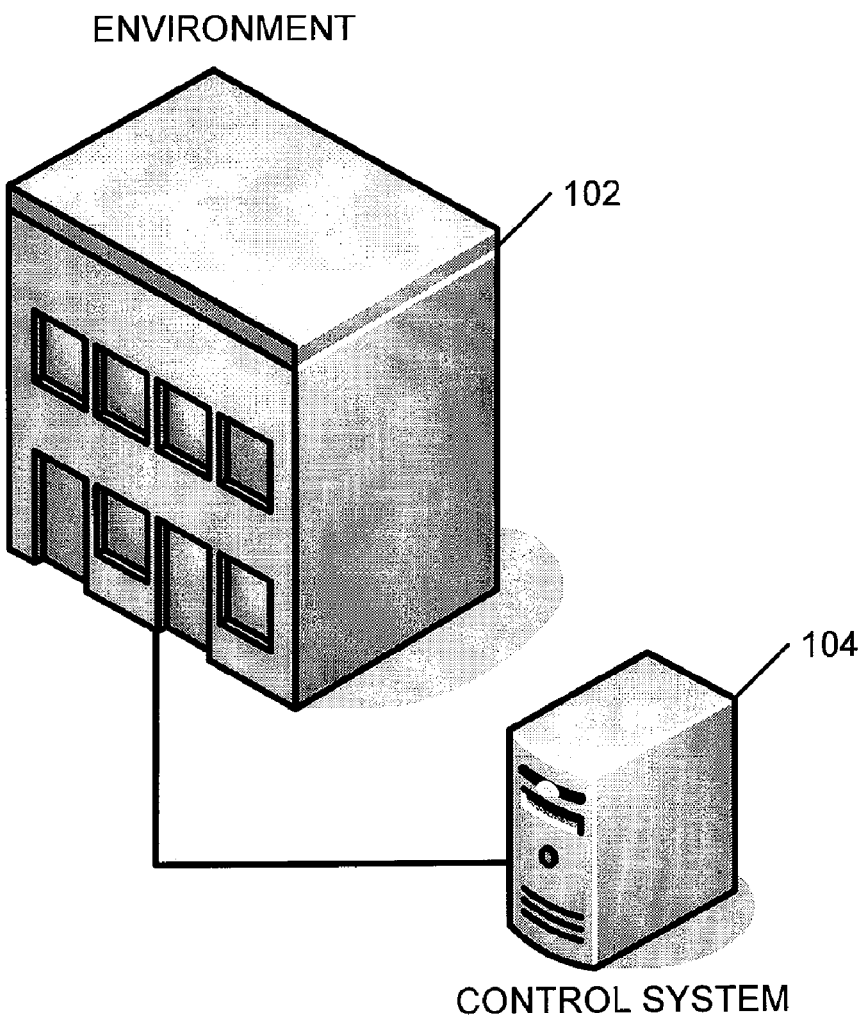
FIG. 1 is a nonlimiting example of a control system that may be configured to communicate with one or more assets associated with an environment.

Included in this disclosure is a plurality of processes, tools, and technologies that may enable a client to ensure optimum performance of assets, critical business equipment and systems to reduce the total cost of energy by reducing energy usage, optimizing energy demand, optimizing energy performance optimization systems and energy using asset efficiencies, and reducing maintenance service costs, prolonging the useful life of assets, and enhancing reliability of business operations. Additionally, this disclosure addresses optimization of energy expenditures at a system level. This allows a client to regulate energy usage, asset repair and replacement, and equipment maintenance to reduce operating costs, via a connection to an organization's Energy Management System (EMS) or Building Management System (BMS) using a virtual audit tool and/or other diagnostic routines. The virtual audit tool may be configured to collect data and may apply predictive knowledge in analyzing operating trends. The audit tool may be configured to assess the facility operating conditions at intervals for optimization of usage, asset and service performance, etc. Signs of asset degradation may be detected and, if such degradation cannot be corrected remotely, a punch-list of prioritized, corrective actions for execution by the client and/or designated third party may be created.

The client benefits from this proactive continuous commissioning of EMS and assets, assuring that these efforts deliver an expanded return on investment as well as providing critical assessments of energy related assets and business performance. This can ensure reliability of business operations and deliver designed energy efficiencies and other reductions in operating costs. Energy related third party performance may be assessed to assure compliance with standards, agreements, and budgeted expenses. An equipment scorecard for tracking performance by a make, model, and configuration of EMS and assets, and a third party service vendor scorecard for tracking performance by a vendor and by facility is one of a plurality of measurement and decision analysis tools that may be available in this disclosure.

This disclosure also discusses a plurality of elements associated with performance assurance. More specifically, included in this disclosure are embodiments of Customer-Premises Equipment (CPE) interface, interrogation, optimization, and control. Unlike other processes, the asset optimization solutions disclosed herein performance assurance can be configured to inter-operate with a plurality of EMSs and/or Building Automation Systems (BASs) through a comprehensive set of drivers. The performance assurance system, which may include elements of an asset optimization solution suite, may be configured to communicate by utilizing any of a plurality of proprietary protocols, protocol conversion tools, and/or the use of custom designed data acquisition paths. This ability to work with virtually any EMS or BAS protocol and select equipment assets may allow clients who have acquired mixed EMS and/or BAS assets and equipment to manage those assets without having to spend large sums of money for a single standard technology.

Unlike EMS and BAS alarms, asset optimization techniques disclosed herein proactively and continually assess EMS and/or BAS, perform security and safety tests, and exercises not only the EMS and/or BAS, but also one or more assets associated with the environment. This may include, but is not limited to, heating systems, ventilation systems, Heating, Ventilation and Air Conditioning (HVAC) systems, lighting systems, security systems, process controllers, refrigerators, and/or other processes.

Unlike EMS and BAS alarms, asset optimization and the performance assurance system may be exercised using proprietary software tools, including commands, protocols, algorithms, data, and/or mathematical models, which far exceed the knowledge possible from any one technician or group of technicians. Asset optimization may be utilized with one or more servers and/or other computing devices and can perform a plurality of virtual audits and/or other tasks and processes in the time that a technician could test only a few systems.

Asset optimization may also include a digital data library, a data store, and/or other components. More specifically, the data store may include current and/or historical data on one or more pieces of customer premises equipment (CPE) for one or more customers. Specifications for optimal operation of such assets may also be provided, as well as lists of specific assets by serial number, type, and performance data for similar assets running in similar environments, etc.

In addition, if available, the data store may include a history of one or more services for one or more assets associated with the environment, as well as provide energy billing data. In some cases the data store may also include site and asset drawings, schematics, specification sheets, as-built drawings, site and asset photographs, and/or other data. Information may be delivered to the user in any of a plurality of ways including, via the Internet, world wide web, email, facsimile, cell phone, pager, PDA, and/or other device configured to communicate with performance assurance.

FIG. 1 is a nonlimiting example of a control system that may be configured to communicate with one or more assets in an environment. As illustrated in the nonlimiting example of FIG. 1, environment 102 is coupled to a control system 104. Environment 102 may include one or more assets, such as an air-conditioning unit, a heater unit, security system, components to a fire alarm system, components to an electrical system, and/or other assets, as nonlimiting examples. Control system 104 may be configured to communicate data to and/or from one or more of the assets associated with environment 102. As discussed above, utilization of control system 104 with environment 102 may allow more efficient utilization of assets within the environment 102 by controlling usage based on user preferences.

Figure 2:
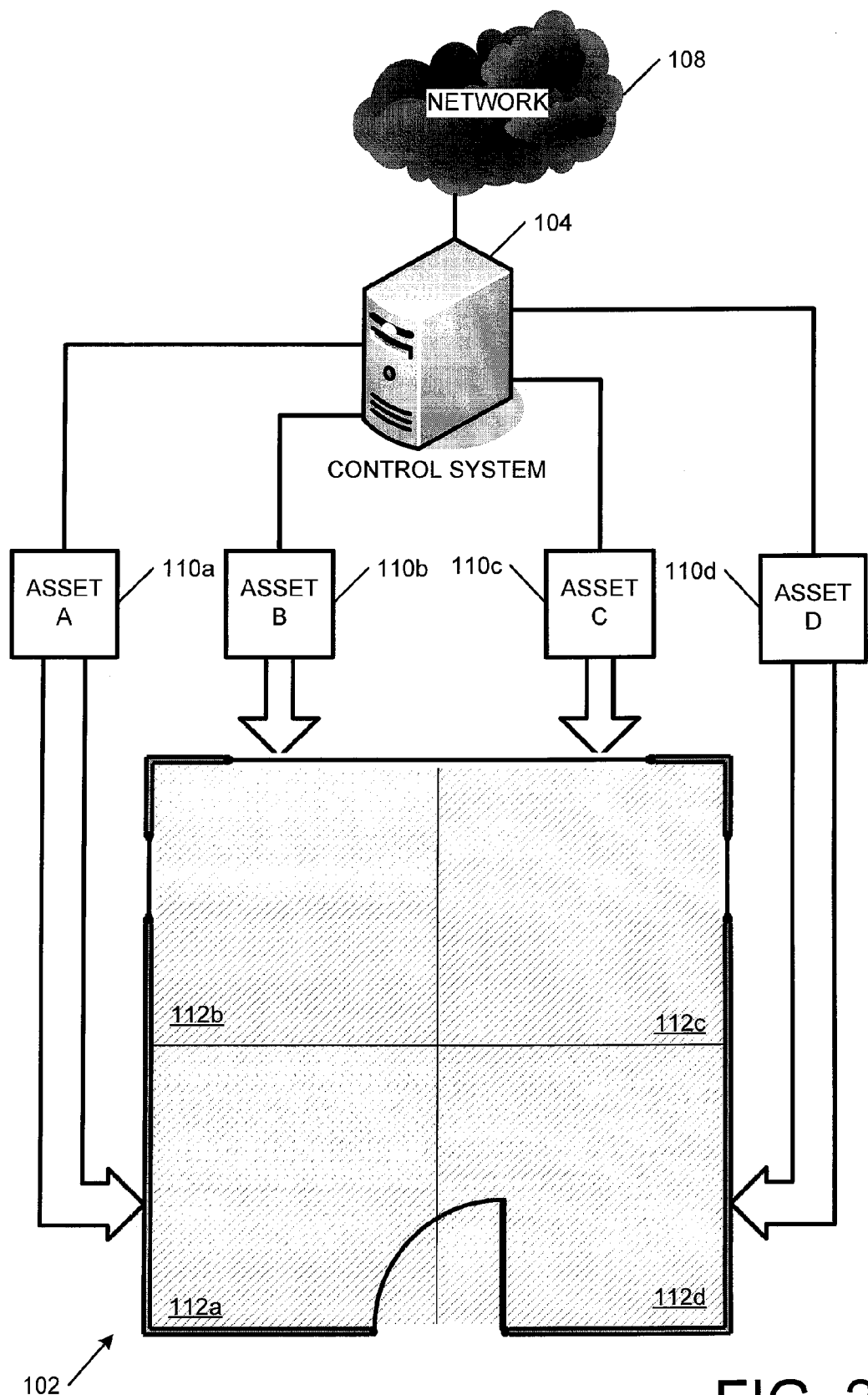
FIG. 2 is a nonlimiting example of a control system configured to communicate with a plurality of assets associated with an environment, similar to the control system from FIG. 1.

FIG. 2 is a nonlimiting example of a control system configured to communicate with a plurality of assets associated with an environment, similar to the control system from FIG. 1. As illustrated in the nonlimiting example of FIG. 2, environment 102 can include a plurality of areas 112*a*, 112*b*, 112*c*, and 112*d*, which may be associated with one or more assets 110*a*, 110*b*, 110*c*, and 110*d*. More specifically, as illustrated in FIG. 2, asset A 110*a* is associated with area 112*a*. Asset A 110*a* may be an HVAC unit configured to heat and cool area 112*a*. Asset B 110*b* may be an HVAC system configured to heat and/or cool area 112*b*. Similarly, asset C 110*c* and asset D 110*d* may be configured to heat and/or cool areas 112*c* and 112*d*, respectively. Control system 104 may be configured to receive data from one or more of the assets 110 and/or send data to one or more of the assets 110. As a nonlimiting example, control system 104 may be configured to control the operation of one or more of the assets 110 on a system level, such that the overall environment 102 may be heated and/or cooled most efficiently. Additionally, control system 104 may be coupled to network 108, which may include the Internet, PSTN, ISDN, cellular mobile network, and/or other communications networks such that data from the environment 102 may be communicated to other parties.

Figure 3:
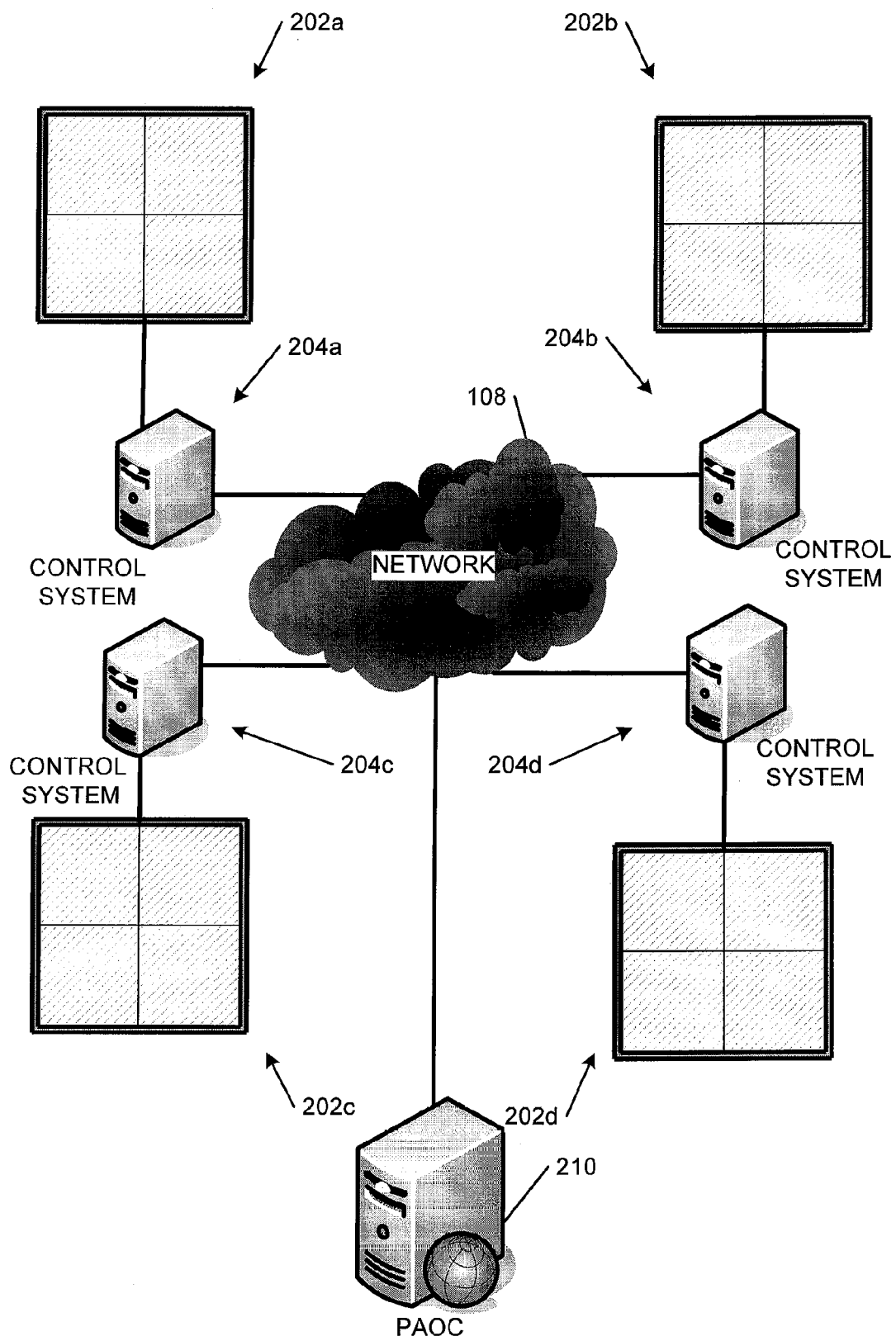
FIG. 3 is a nonlimiting example of a performance assessment and optimization center that may be configured to communicate with one or more environments, similar to the environment of FIG. 2.

FIG. 3 is a nonlimiting example of a performance assessment and optimization center that may be configured to communicate with one or more environments, similar to the environment of FIG. 2. As illustrated in the nonlimiting example of FIG. 3, performance assessment and optimization center 210 may be configured to receive communications from and/or send communications to one or more assets associated with environments 202*a*, 202*b*, 202*c*, and 202*d* via network 108 (and/or communicate with control system 204). More specifically, in at least one embodiment, control systems 204*a*, 204*b*, 204*c*, and 204*d* may be configured to control assets associated with environments 202*a*, 202*b*, 202*c* and 202*d*, respectively. Similarly, in some embodiments, assets associated with environments 202 can send data related to operations of the assets, as well as data related to the environment.

As a nonlimiting example, referring back to FIG. 2, asset A 110*a*, asset B 110*b*, asset C 110*c*, and asset D 110*d* may take the form of HVAC units. One or more of the HVAC units 110 may be configured to maintain the temperature of a predetermined area of environment 102. Additionally, (referring again to FIG. 3), assets 110 can be configured to collect and send data to performance assessment and optimization center 210. The data sent to performance assessment and optimization center 210 can include operation data of the HVAC units, such as efficiency, energy consumption, temperature of exiting air, etc.

Similarly, the data sent to performance assessment and optimization center 210 can include results data, such as ambient temperature, incoming air temperature, etc. One should note that while some configurations include one-way communication (e.g., assets 110 (FIG. 2) send data to performance assessment and optimization center 210) other configurations may include two-way communications (e.g., performance assessment and optimization center 210 sends data to one or more of the assets 110 (FIG. 2) and receives data from one or more of the assets).

After receiving data from assets 110, performance assessment and optimization center 210 can make one or more calculations to determine a performance factor related to the operation of one or more of the assets 110 (and/or the system as a whole). From the calculations and/or performance factor, performance assessment and optimization center 210 can adjust one or more setting on the assets and/or schedule the asset for service by a technician. As discussed in more detail below, performance assessment and optimization center 210 may also store at least a portion of the received and/or calculated data for subsequent use.

One should note that while the embodiments discussed above include air conditioning units, these are nonlimiting examples. More specifically assets 110 (FIG. 2) can include any of a plurality of different devices including, but not limited to, HVAC units, security system components, fire alarm system components, appliances, electronic components, electrical system components, computing logic, etc. Additionally, as different assets may be configured for different functionality, data sent between asset 110*a* (FIG. 2) and performance assessment and optimization center 210 may differ from data sent between asset 110*b* (FIG. 2) and performance assessment and optimization center 210, depending on the particular configuration.

Additionally, while the embodiments described above include a single system (e.g., an HVAC system) associated with an environment, this is also a nonlimiting example. More specifically, depending on the particular configuration, an environment can include any number of different systems, each system with one or more assets that may be communicatively coupled to performance assessment and optimization center 210.

Figure 4:
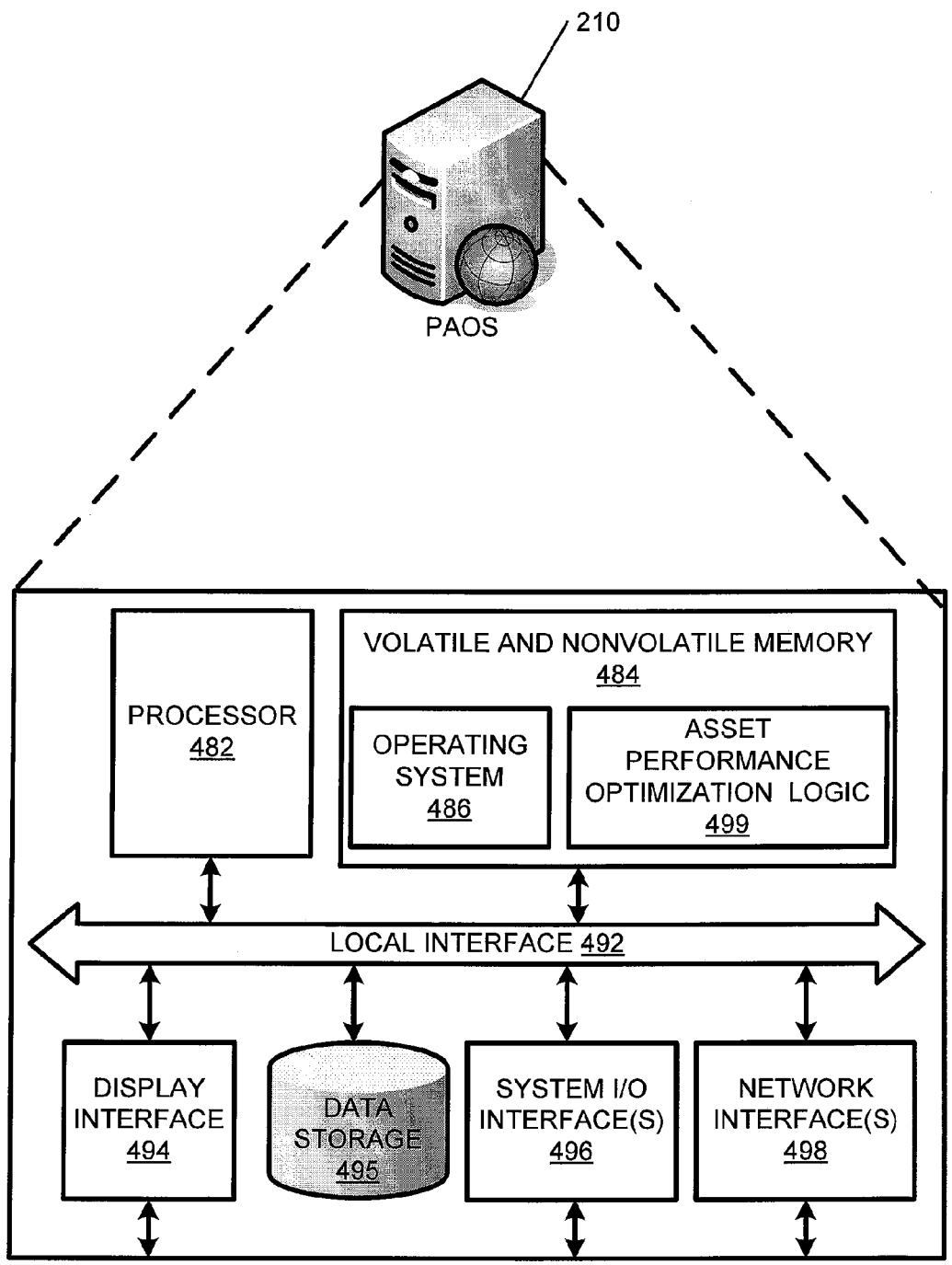
FIG. 4 is a functional block diagram illustrating a plurality of components that may be associated with the performance assessment and optimization center of FIG. 3.

FIG. 4 is a block diagram illustrating an exemplary embodiment of a performance assessment and optimization center that may be configured to communicate via a communications network such as the network from FIG. 2. Although a wire-line client device is illustrated, this discussion can be applied to wireless devices, as well. Generally, in terms of hardware architecture, as shown in FIG. 4, the performance assessment and optimization center 210 includes a processor 482, volatile and nonvolatile memory 484, a display interface 494, data storage 495, one or more input and/or output (I/O) device interface(s) 496, and/or one or more network interface 498 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a device for executing software, particularly software stored in volatile and nonvolatile memory 484.

The processor 482 can be any custom made or commercially available processor, a central processing unit (CPU), an auxiliary processor among several processors associated with the client device 106, a semiconductor based microprocessor (in the form of a microchip or chip set), a macroprocessor, or generally any device for executing software instructions.

The volatile and nonvolatile memory 484 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 484 may incorporate electronic, magnetic, optical, and/or other types of storage media. One should note that the volatile and nonvolatile memory 484 can have a distributed architecture (where various components are situated remote from one another), but can be accessed by the processor 482. Additionally volatile and nonvolatile memory 484 can include asset performance optimization logic 499 and an operating system 486.

The software in volatile and nonvolatile memory 484 may include one or more separate programs, each of which includes an ordered listing of executable instructions for implementing logical functions. In the example of FIG. 4, the software in the volatile and nonvolatile memory 484 may include asset management logic 499, as well as operating system 486. The operating system 486 essentially controls the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 484, so as to operate properly in connection with the operating system 486.

The Input/Output devices that may be coupled to system I/O Interface(s) 496 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more network interfaces 498 for facilitating communication with one or more other devices. More specifically, network interface 498 may include any component configured to facilitate a connection with another device. While in some embodiments, among others, the performance assessment and optimization center 210 can include a network interface 498 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include network interfaces 498 for communicating via a wired connection. Such interfaces may be configured with Universal Serial Bus (USB) interfaces, serial ports, and/or other interfaces.

If performance assessment and optimization center 210 includes a personal computer, workstation, or the like, the software in the volatile and nonvolatile memory 484 may further include a basic input output system (BIOS) (omitted for simplicity). The BIOS is a set of software routines that initialize and test hardware at startup, start the operating system 486, and support the transfer of data among the hardware devices. The BIOS is stored in ROM so that the BIOS can be executed when the client device 106 is activated.

When performance assessment and optimization center 210 is in operation, the processor 482 may be configured to execute software stored within the volatile and nonvolatile memory 484, to communicate data to and from the volatile and nonvolatile memory 484, and to generally control operations of the client device 106 pursuant to the software. Software in memory, in whole or in part, may be read by the processor 482, perhaps buffered within the processor 482, and then executed.

One should note that while the description with respect to FIG. 4 includes a performance assessment and optimization center as a single component, this is a nonlimiting example. More specifically, in at least one embodiment, performance assessment and optimization center 210 can include a plurality of servers, personal computers, and/or other devices. Similarly, while asset management logic 499 is illustrated in FIG. 4 as a single software component, this is also a nonlimiting example. In at least one embodiment, asset management logic 499 may include one or more components, embodied in software, hardware, and/or firmware. Additionally, while asset management logic 499 is depicted as residing on a single computing device, as performance assessment and optimization center 210 may include one or more devices, asset management logic 499 may include one or more components residing on one or more different devices.

Figure 5:
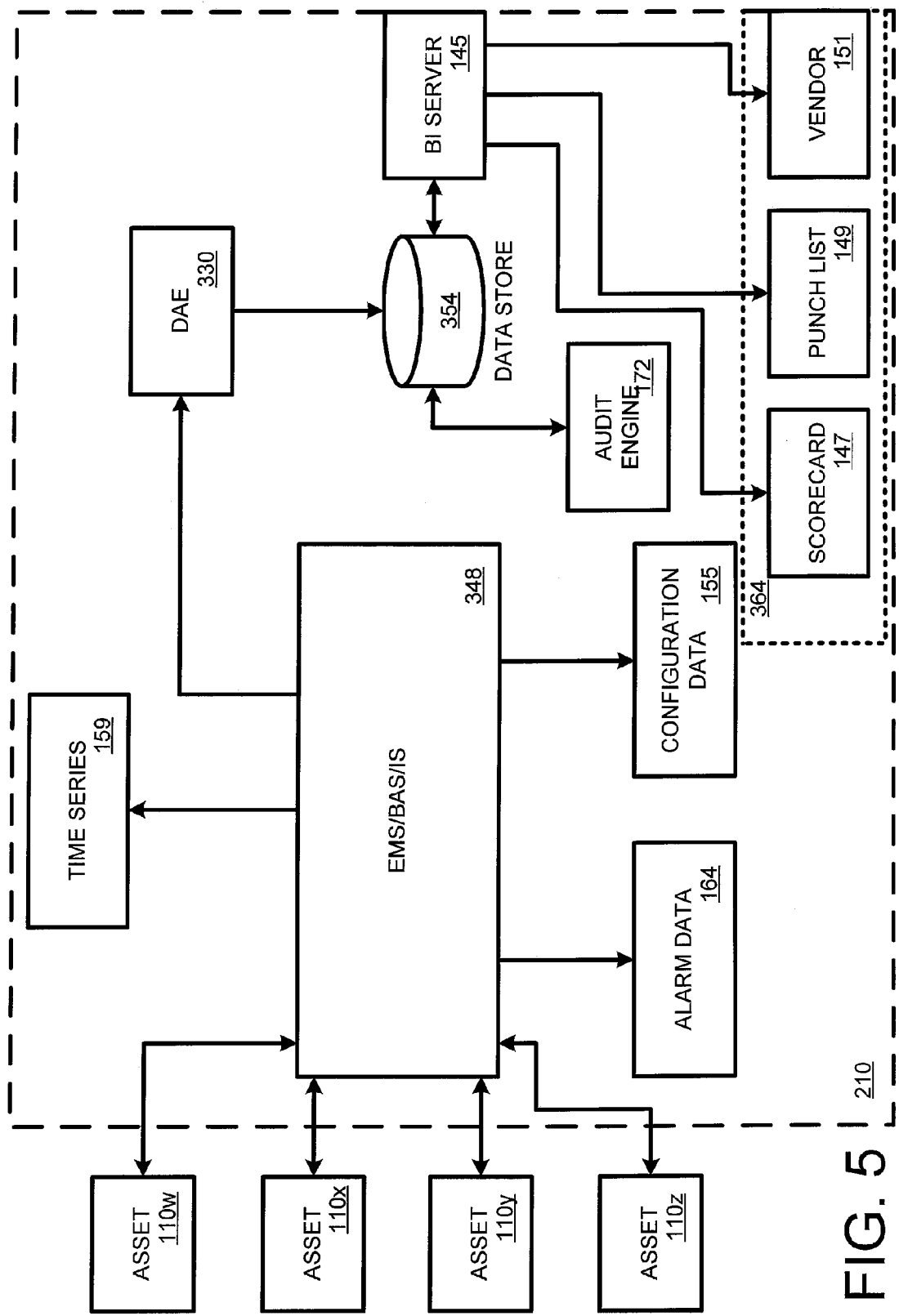
FIG. 5 is a functional block diagram of exemplary components that may be utilized for optimizing assets of an environment, such as the environment from FIG. 3.

FIG. 5 is a functional block diagram of exemplary components that may be utilized for optimizing assets of an environment, such as the environment from FIG. 3. As illustrated in the nonlimiting example of FIG. 5, performance assessment and optimization center 210 can include one or more components to facilitate communication with an asset and/or calculation of received data. More specifically, performance assessment and optimization center 210 may include a Energy Management System (EMS), a Building Automation system (BAS), and/or other Information System (IS) for communicating with one or more assets 110w, 110x, 110y, and 110z (hereinafter EMS/BAS/IS 348). The EMS/BAS/IS 348 may include a customer data component (not shown). Customer data component can be configured to receive customer data related to an asset. More specifically, customer data may include a name, address, telephone number, email address related to the customer. Other data that may be received includes service agreement data, previous purchases, previous services on an asset, and/or other data.

Also included in the EMS/BAS/IS 348 is a weather data component (not shown). The weather data component can be configured to receive weather data related to the environment where the assets operate. Weather data may be utilized to accommodate for changes in seasons, as well as short-term weather changes such as storms, heat, blizzards, etc.

A market data component may be included with the EMS/BAS/IS 348 and can be configured to receive market data such as commodity pricing data, day ahead energy pricing, and historical closing prices of electricity and natural gas. Similarly, a real time alarms component can be included with the EMS/BAS/IS 348 and configured to receive rules and other data for triggering an alarm. As a nonlimiting example, an air conditioning system may be configured to cool an environment. If it is determined that an alarm should be triggered if the temperature reaches 85° F. (or higher), the real time capture component can be configured to capture data related to this alarm such that the EMS/BAS/IS 348 can address the situation.

Some embodiments of the EMS/BAS/IS 348 may include a service bill data component (not shown). The service bill data component can be configured to receive data related to a client's service bill. As a nonlimiting example, if the system includes a security system, the service bill data component can be configured to receive data related to the security system bill. This data can include previous payments, current charges, current options to which the client subscribes, and/or other data related to the services received.

The EMS/BAS/IS 348 may also include a meter data component (not shown). The meter data component can be configured to receive data related to energy demand and units of consumption. Similarly, a CMMS data component (not shown) can be configured to provide historical data on mechanical services related to one or more assets. Additionally, an industry benchmarks component (not shown) can be configured to provide details on manufacturer specifications and performance parameters. The EMS/BAS/IS 348 can be configured with one or more algorithms, such as quality assurance (QA) algorithms, audit algorithms, validation algorithms, estimation algorithms, normalization algorithms, rationalization algorithms, units conversion algorithms, business/operations rules algorithms, and/or other algorithms.

The EMS/BAS/IS 348 may be configured to receive data associated with one or more of the assets (which may or may not be associated with a common environment). Upon receiving data from the asset(s), the EMS/BAS/IS 348 may be configured to produce time series data 159, alarm data 164, and/or configuration data 155. Additionally, the EMS/BAS/IS 348 may be configured to send data to a Data Acquisition Engine (DAE) 330. The DAE 330 may be configured to acquire data from the EMS/BAS/IS 348 and send the acquired data to a data store 354. Also coupled to the data store 354 is an audit engine 172. The audit engine may be configured to retrieve data from the data store 354. A bidirectional (BI) server 145 may also be coupled to the data store 354 for producing scorecards 147, punch lists 149, and/or vendor data 151.

The data store 354 can include storage capabilities and may be configured to rely on the acquisition of information from any of a number of sources.

Once in the data store 354, the audit engine 172 receives data from the assets to identify anomalies and/or inefficiencies with operation of an asset (and/or the system as a whole), the cause of the anomalies and/or inefficiencies, and recommendations to resolve these problems. The recommendations may be provided to the client and/or a designated agent, such as a service company representative. Other embodiments can include producing one or more reports, including but not limited to a prioritized punch list of items that may be completed to obtain optimal performance, a prioritized punch list by other larger aggregations, such as a district or an entire company's portfolio, asset scorecards, vendor scorecards, and/or service scorecards, which may be configured to allow customers to make accurate and timely decisions on how to optimize the results from a system, site, portfolio, and vendor. One or more of these reports may be available and may be transmitted by email, cellular telephone, pager, facsimile, and/or a web-based customer interface 364.

The data stored in data store 354 may be utilized for ensuring asset performance and optimization. Additionally, data in data store 354 may be subject to asset optimization expert models, including but not limited to, proprietary algorithms, decision analytics, and predictive models.

Additionally, in at least one embodiment, the audit engine 172 may be configured to routinely assess assets and equipment operating performance to assure optimization and identify, quantify and prioritize incipient asset degradation which may negatively impact asset performance leading to increased energy costs and, increases in the cost of asset repair/replacements or service maintenance. An initial application of the audit engine 172 may produce an asset performance baseline and scoring of each component and overall unit (via the scorecard 149) for measuring future improvement. Audit engine 172 may be run prior to any Preventive Maintenance (PM) visit to create for the service maintenance provider a prioritized punch list 149 of operating issues requiring a technician's attention.

The audit engine 172 may be exercised after the PM to ensure work was completed correctly, critical systems are performing reliably, and to verify that the building is operating in a fully optimized, cost-effective manner.

Additionally, embodiments of performance assessment and optimization center 210 may be configured to resolve and continuously optimize portfolio assets, as well as an entire building system to deliver the highest level of business reliability at the least cost. Performance may be measured through improvements to asset and building optimization scorecards and energy efficiency scorecards 147. These reports may be available for analysis and review via preview component on the interface 364, which may be configured as a web-based decision analytics tool.

Successful asset optimization may be configured to provide a meaningful, measurable and sustainable increase in asset and building performance. The net result may lead to simultaneous improvement in up time of business equipment and reduced costs of unplanned maintenance service, asset repair and replacement, and energy usage. These economic benefits are matched with the assurance of the highest levels of business reliability.

Figure 6:
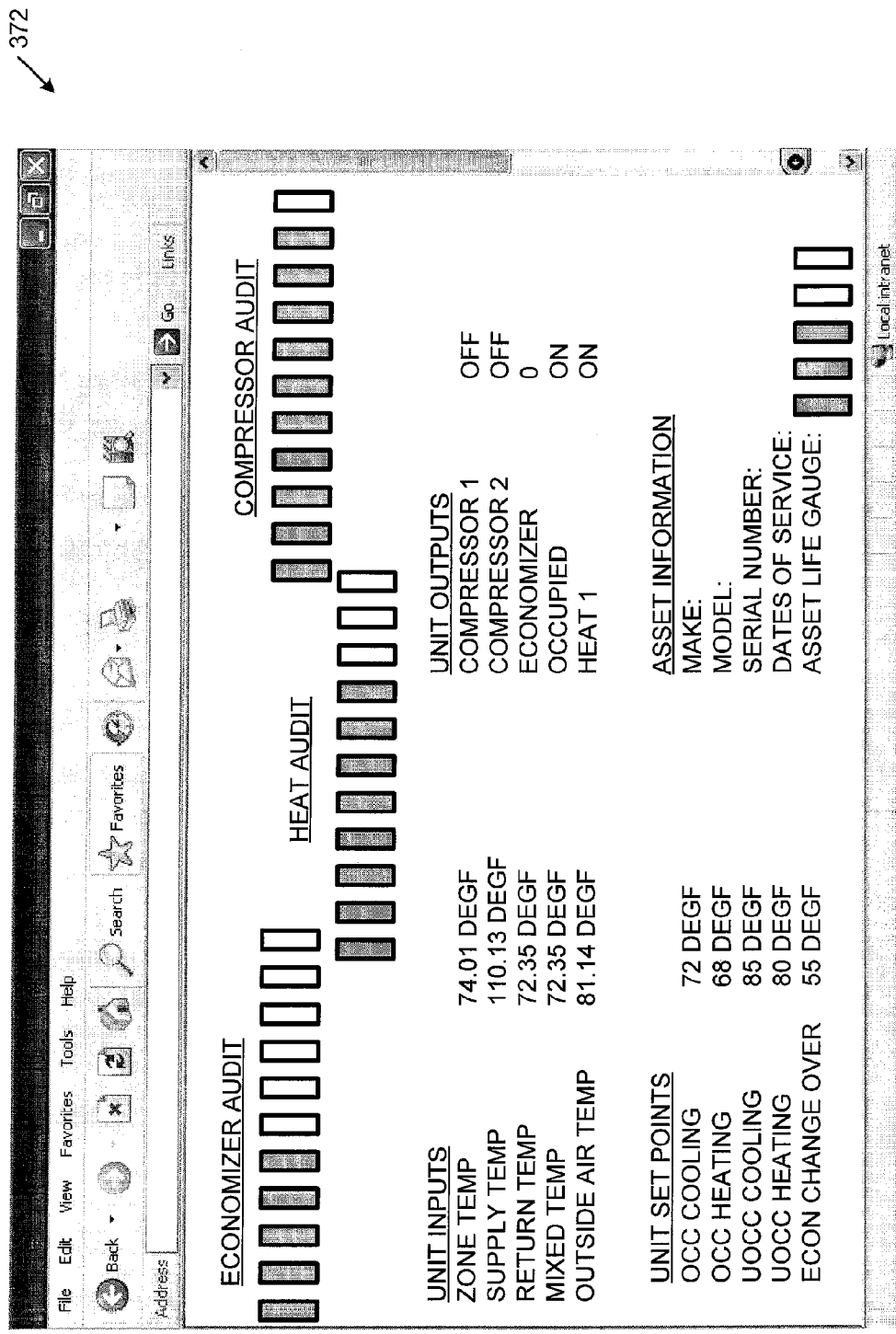
FIG. 6 is an exemplary user interface illustrating a virtual audit display, the user interface being associated with one or more of the assets from FIG. 2.

FIG. 6 is an exemplary user interface illustrating a virtual audit display, the user interface being associated with one or more of the assets from FIG. 2. As illustrated in the nonlimiting example of FIG. 6, user interface 372 may be provided by the virtual audit engine 172 (FIG. 5) and can be configured to display one or more audits associated with an asset. More specifically, referring to asset A 110*a* from FIG. 2 (which in that nonlimiting example is an HVAC unit), user interface 372 can provide information related to the operation of an economizer, information related to the heater, and information related to the compressor of the asset. Additionally, data related to asset inputs may be provided, such as current zone temperature, supply air temperature, return temperature, mixed temperature, and outside air temperature.

Asset set points may also be provided by user interface 372. Asset set points can, as a nonlimiting example, include Occupied (OCC) cooling temperature, OCC heating temperature, Unoccupied (UOCC) cooling temperature, UOCC heating temperature, and economizer change over temperature. Unit outputs may also be provided by user interface 372, and may include data related to the states of one or more components of the assets (in this nonlimiting example, compressors, economizers, occupied, and heater). Asset information may also be provided by user interface 372. Asset information may include make, model, serial number, dates of service, and an asset life gauge.

One should note that while user interface 372 provides data related to an HVAC unit, data related to any asset may be provided. More specifically, any data related to the operation of an asset may be provided by user interface 372.

Figure 7:
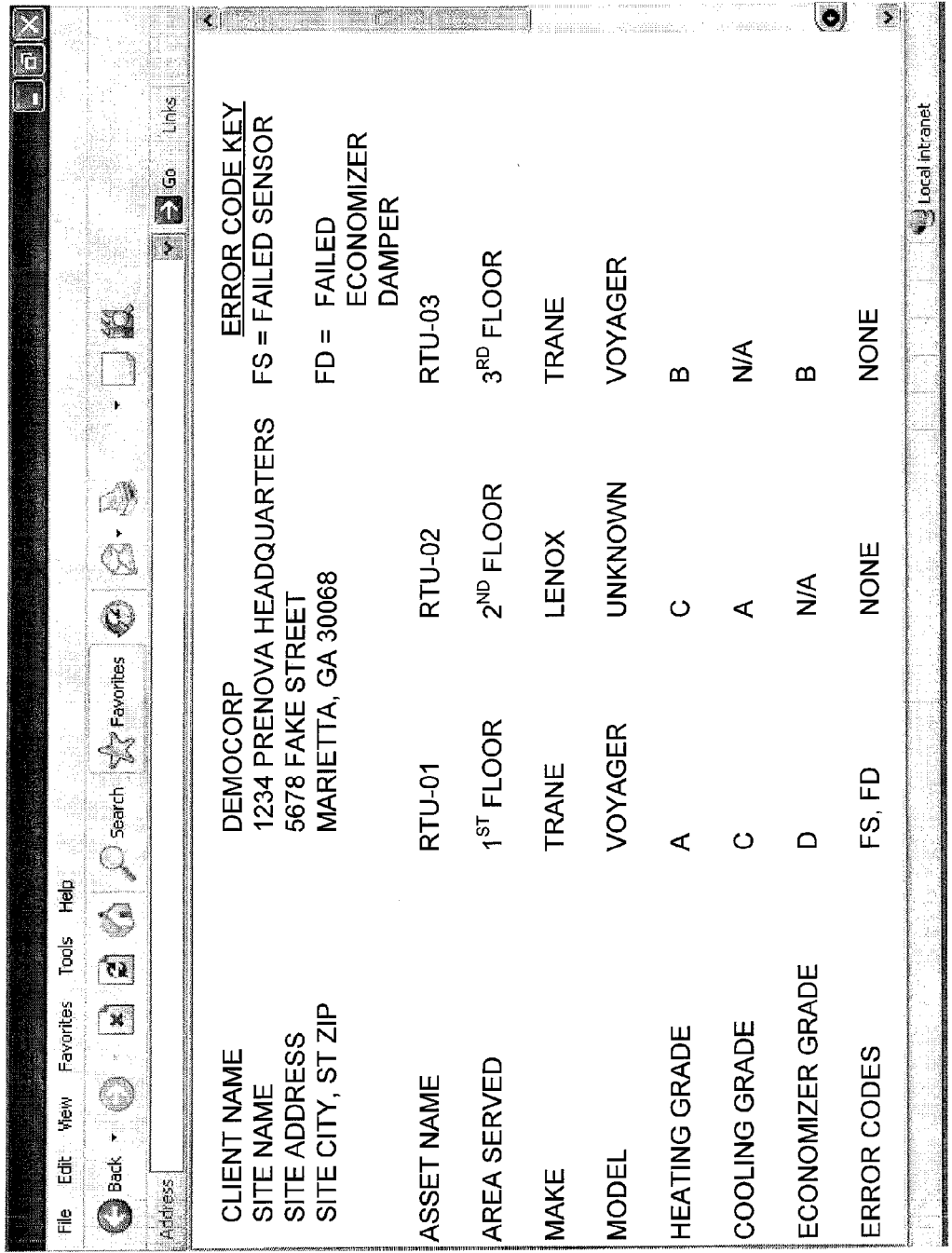
FIG. 7 is an exemplary user interface illustrating a detailed description for one or more assets associated with an environment, similar to the user interface from FIG. 6.

FIG. 7 is an exemplary user interface illustrating a detailed description for one or more assets associated with an environment, similar to the user interface from FIG. 6. As illustrated in the nonlimiting example of FIG. 7, user interface 402 can be configured to calculate one or more parameters associated with an asset and/or environment and provide as asset scorecard that includes client data associated with an environment. As a nonlimiting example, user interface 402 can be configured to provide data related to "DemoCorp." Contact information including a site name, site address, site telephone number, site email address, site IM address, etc. may be provided. Additionally, user interface 402 can be configured to provide information related to areas that one or more assets service. More specifically, with reference to FIG. 8, asset RTU-01 is configured to service the first floor of "Prenova Headquarters." This asset is a Trane Voyager, and has been graded on various areas of performance. Error codes are also provided.

FIG. 8 is an exemplary user interface illustrating a work order listing for one or more of the as sets from FIG. 7. As illustrated in the nonlimiting example of FIG. 8, the performance asset optimization center 210 can be configured to determine one or more problems to address with respect to an asset, a plurality of assets, and/or an environment, as a whole. The user interface 422 can then provide this data as a prioritized punch list, which may include data related to work orders of one or more assets. As illustrated, user interface can provide data related to asset RTU-01 from FIG. 7. In addition to identification information provided, information related to the error codes from FIG. 7 may also be provided. More specifically, RTU-01 from FIG. 7 is associated with error codes for a failed sensor and a failed economizer damper. This data may be displayed in user interface 422 of FIG. 8, as well as the item that is malfunctioning, parts needed, and priority.

One should note that while at least one embodiment of user interface 422 can be configured to provide detailed information related to one or more of the error codes from FIG. 7, this is merely a nonlimiting example. More specifically, some embodiments may be configured to provide data related to error codes that have been addressed, are currently being addressed, and/or will be addressed.

Figure 9:
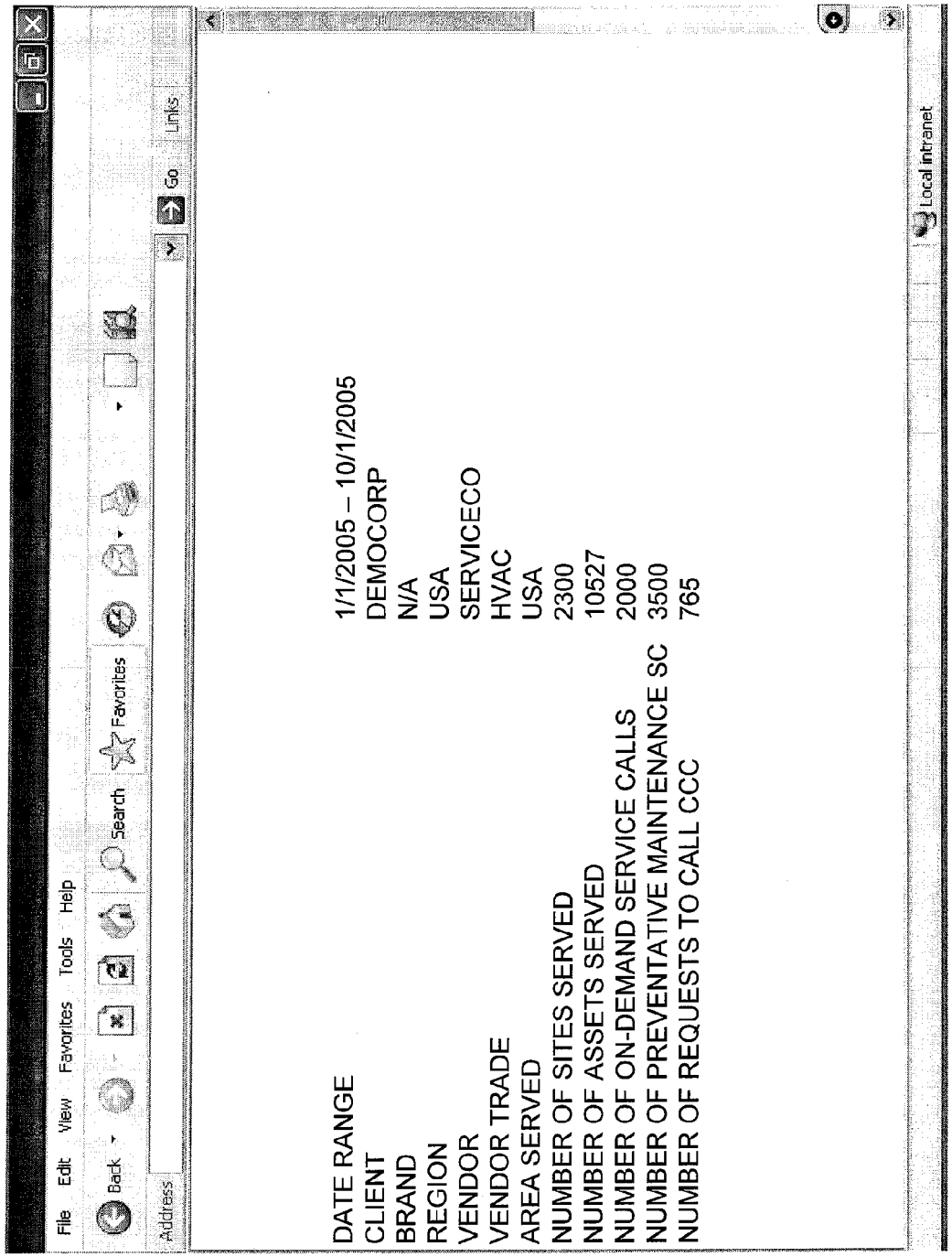
FIG. 9 is an exemplary user interface illustrating client information for the client from FIG. 8.

FIG. 9 is an exemplary user interface illustrating client information for the client from FIG. 8. As illustrated in the nonlimiting example of FIG. 9, the performance asset optimization center 210 may be configured to receive data related to assets and/or an environment, as a whole. Upon receiving this data, the performance asset optimization center 210 may calculate various data associated with the operation and/or maintenance of the assets and/or environment. The performance asset optimization center may then provide a user interface 442 that can be configured to provide a vendor scorecard, which may include data related to a coverage area for a customer. More specifically, as illustrated in the nonlimiting example of FIG. 9, DemoCorp has 2300 sites that are currently being serviced, with 10527 assets. The number of on-demand service calls is documented, as well as the number of preventative maintenance service calls and the number of requests to call a Command Control Center (CCC) for ensuring asset performance and optimization.

Figure 10:
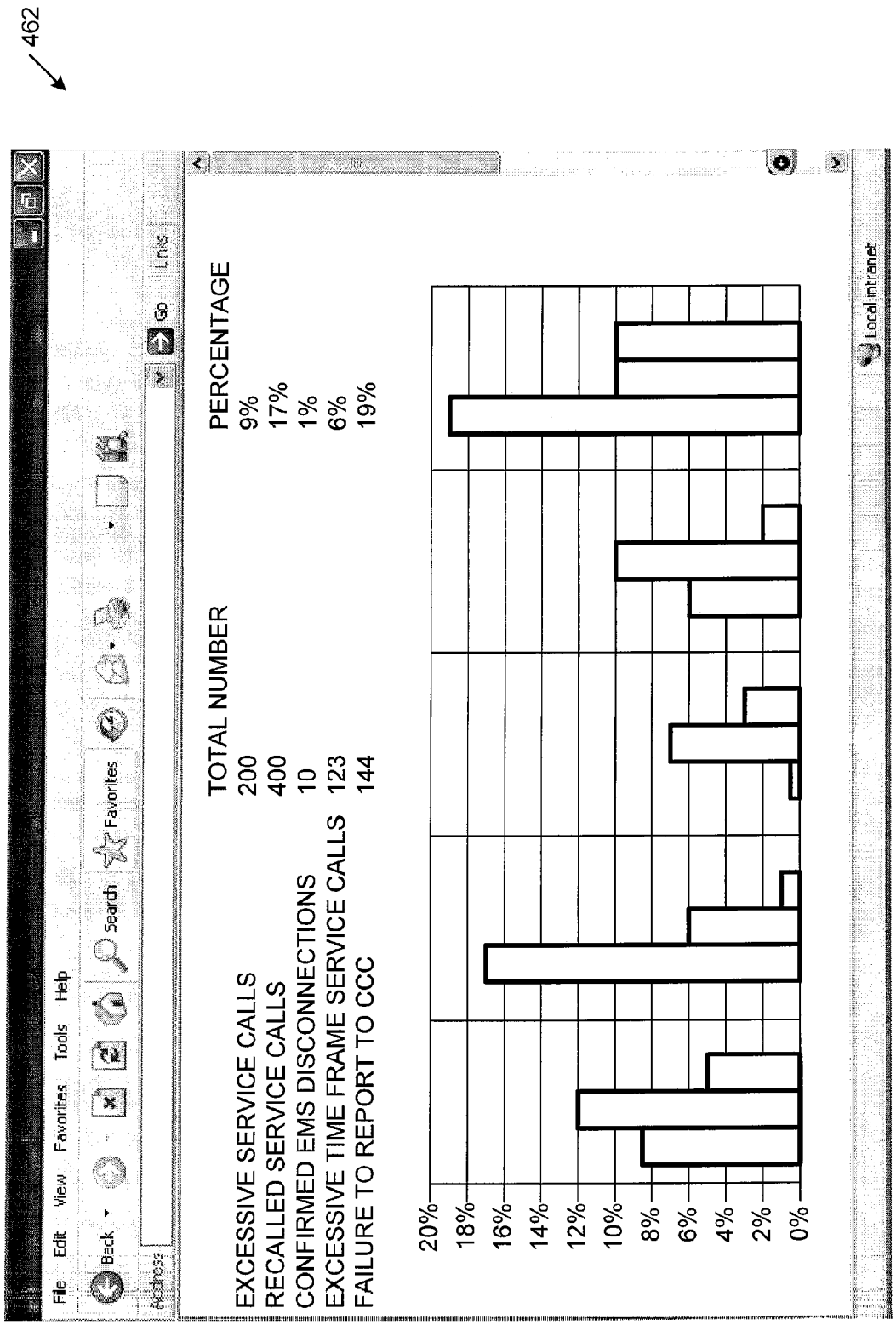
FIG. 10 is an exemplary user interface illustrating service call data for a client, similar to the user interface from FIG. 9.

FIG. 10 is an exemplary user interface illustrating service call data for a client, similar to the user interface from FIG. 9. As illustrated in the nonlimiting example of FIG. 10, the performance asset optimization center 210 may be configured to compile data associated with service calls associated with an asset, a plurality of assets, and/or an environment. This data may be received from a customer service representative, a technician, and/or from another source. Upon receiving this data the performance asset optimization center 210 may calculate one or more metrics associated with this data and provide a user interface 462 that may be configured to provide a service scorecard, which may include service call data related to at least a portion of assets serviced by performance assessment and optimization center 210. While in at least one embodiment, user interface 462 can be configured to provide data related to one asset, other configurations can be configured to provide data related to a plurality of assets, one or more environments, and/or one or more customers.

User interface 462 may also be configured to provide data related to the total number of excessive service calls, as well as a percentage of calls that are excessive. Similarly, user interface can be configured to provide data related to recalled service calls, confirmed EMS disconnections, excessive time frame for service calls, and failure to report to CCC. A graphical display of at least a portion of this data may also be provided.

Figure 11:
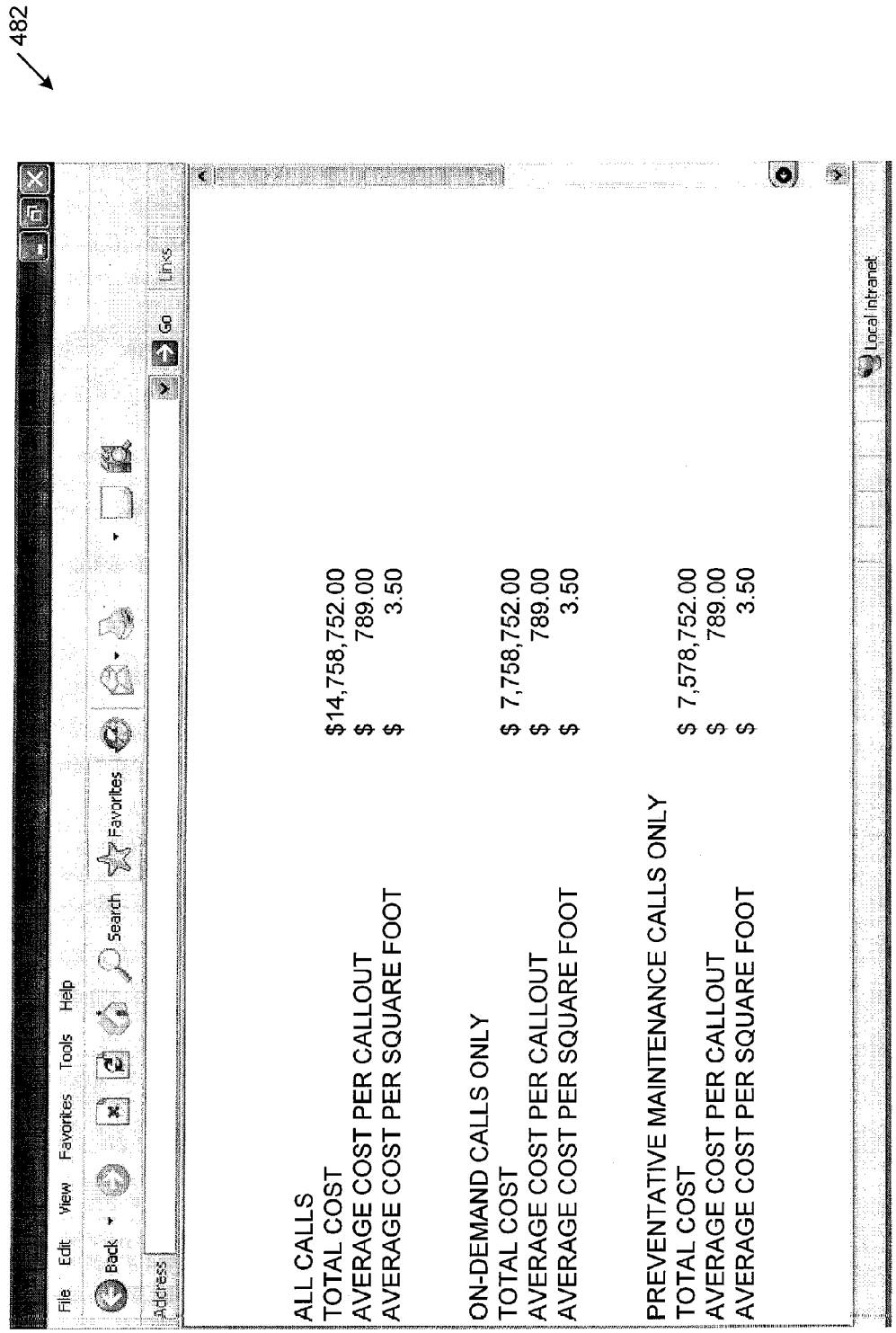
FIG. 11 is an exemplary user interface illustrating cost data associated with service calls, similar to the user interface from FIG. 10.

FIG. 11 is an exemplary user interface illustrating cost data associated with service calls, similar to the user interface from FIG. 10. As illustrated in FIG. 11, the performance asset optimization center 210 may be configured to receive data associated with the cost of maintenance and/or problem resolution with respect to an asset, a plurality of assets, and/or an environment. More specifically, the performance asset optimization center 210 may be configured to receive data from a billing department and/or other entity and compile the received data to provide information associated with the overall cost of an asset (and/or environment). The performance asset optimization center 210 can then provide a user interface 482 that can be configured to provide a service scorecard, which may include costs related to calls received by performance assessment and optimization center 210. Similar to the nonlimiting example of FIG. 10, this data can relate to a one or more assets, environments, and/or customers. The data in FIG. 11 includes a total cost of all calls, an average cost per callout, and an average cost per square foot. With on-demand calls only, a total cost is provided, as well as an average cost per callout, and an average cost per square foot. With preventative maintenance calls only, a total cost is provided, as well as an average cost per callout, as well as an average cost per square foot.

Figure 12:
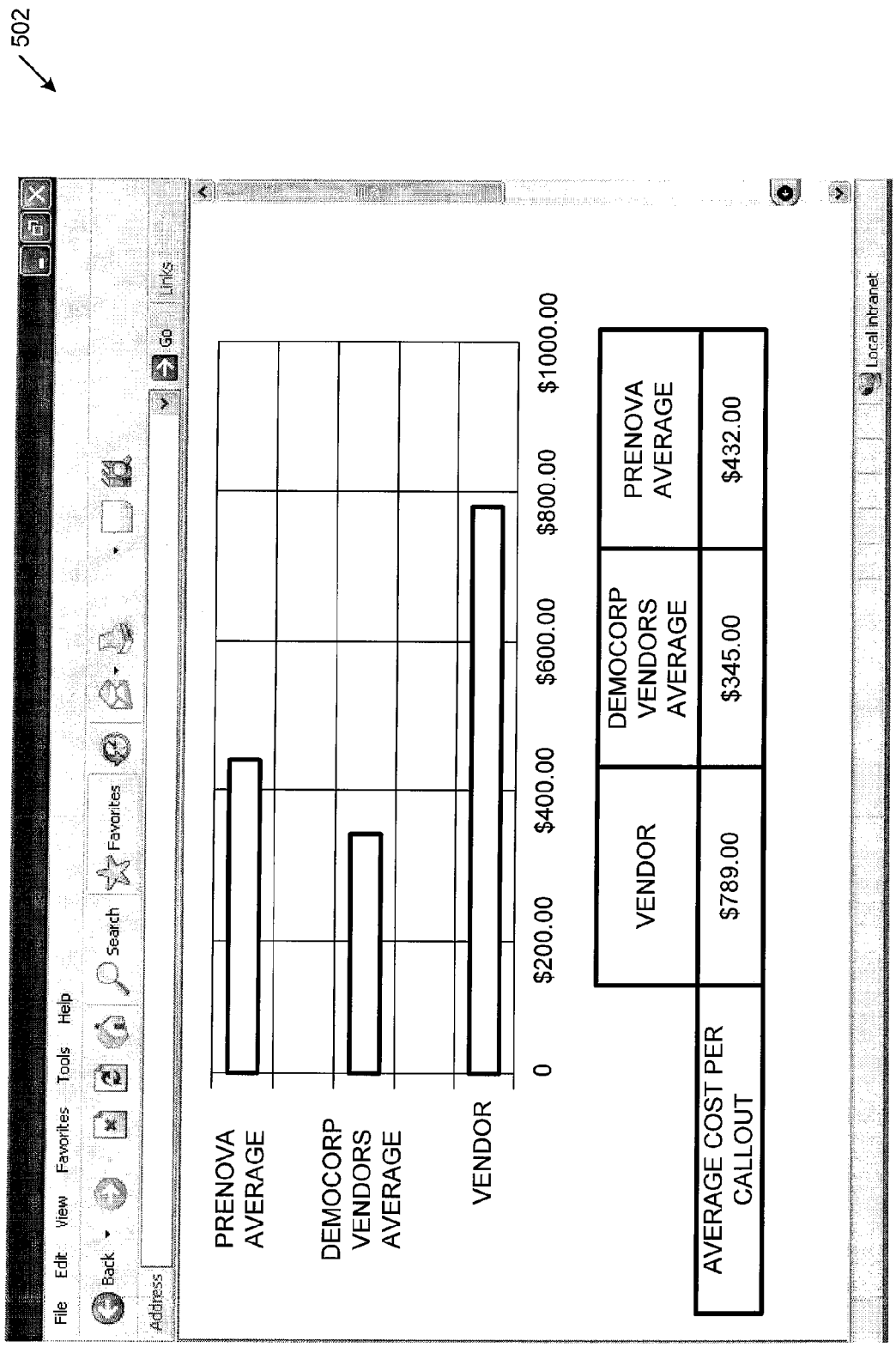
FIG. 12 is an exemplary user interface illustrating an average cost per callout, similar to the user interface from FIG. 11.

FIG. 12 is an exemplary user interface illustrating an average cost per callout, similar to the user interface from FIG. 11. As illustrated in the nonlimiting example of FIG. 12, the performance asset optimization center 210 may be configured to receive data associated with a service callout and the costs associated with the callout. The performance asset optimization center 210 may compile the received data and provide a user interface 502 that may be configured to provide comparative data related to a plurality of costs per callout. More specifically, as illustrated in user interface 502, the average cost of a Prenova callout costs $432.00. DemoCorp vendors' average cost is $345.00, while an average vendor's cost is $789.00.

Figure 13:
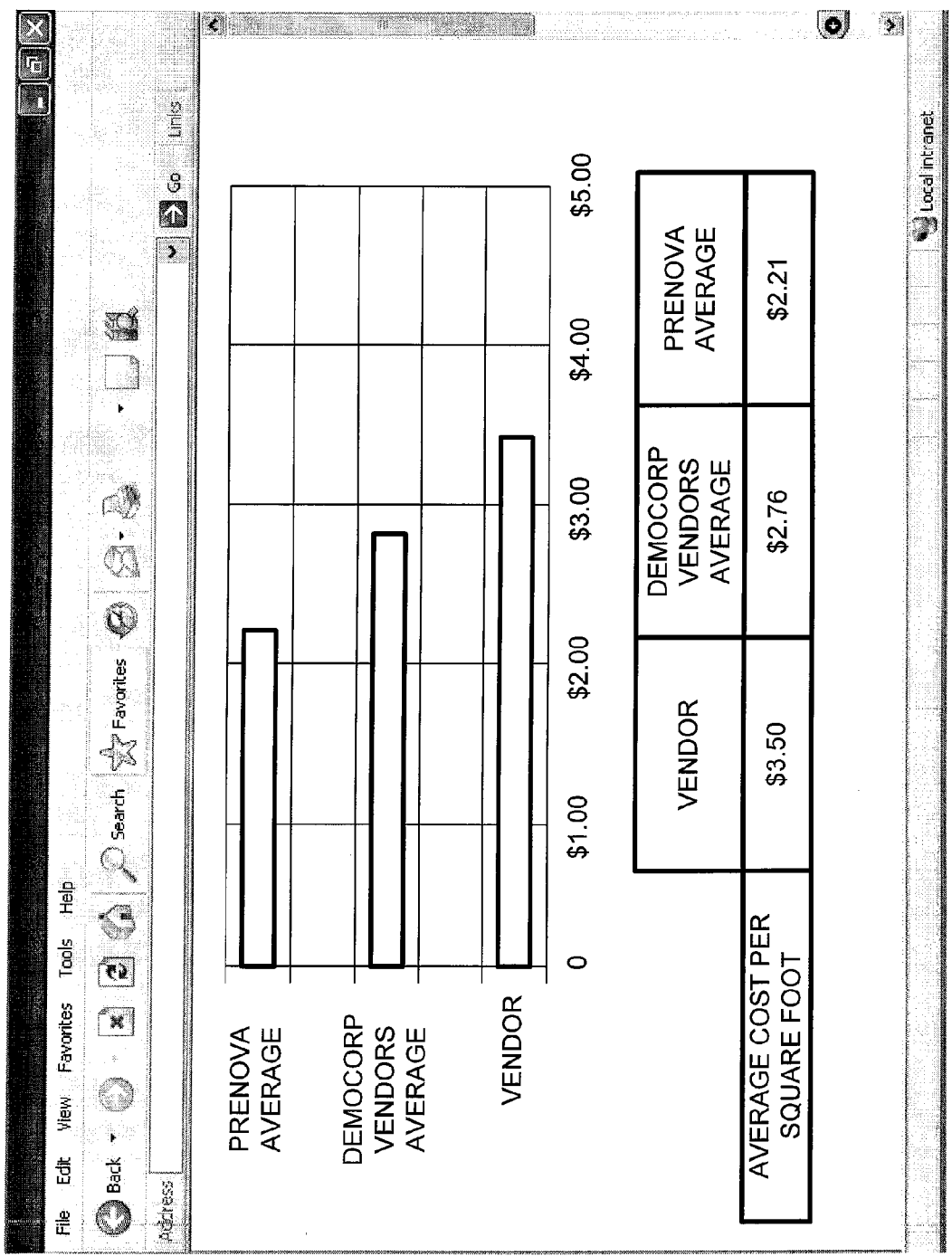
FIG. 13 is an exemplary user interface illustrating an average cost per square foot, similar to the user interface from FIG. 12.

FIG. 13 is an exemplary user interface illustrating an average cost per square foot, similar to the user interface from FIG. 12. As illustrated in the nonlimiting example of FIG. 13, user interface 522 is configured to provide comparative data related to an average cost per square foot for Prenova, DemoCorp Vendors, and an average Vendor. More specifically, as illustrated in this nonlimiting example, the Prenova average cost per square foot is $2.21. The Democorp vendors' average is $2.76, while an average vendor's cost is $3.50.

Figure 14:
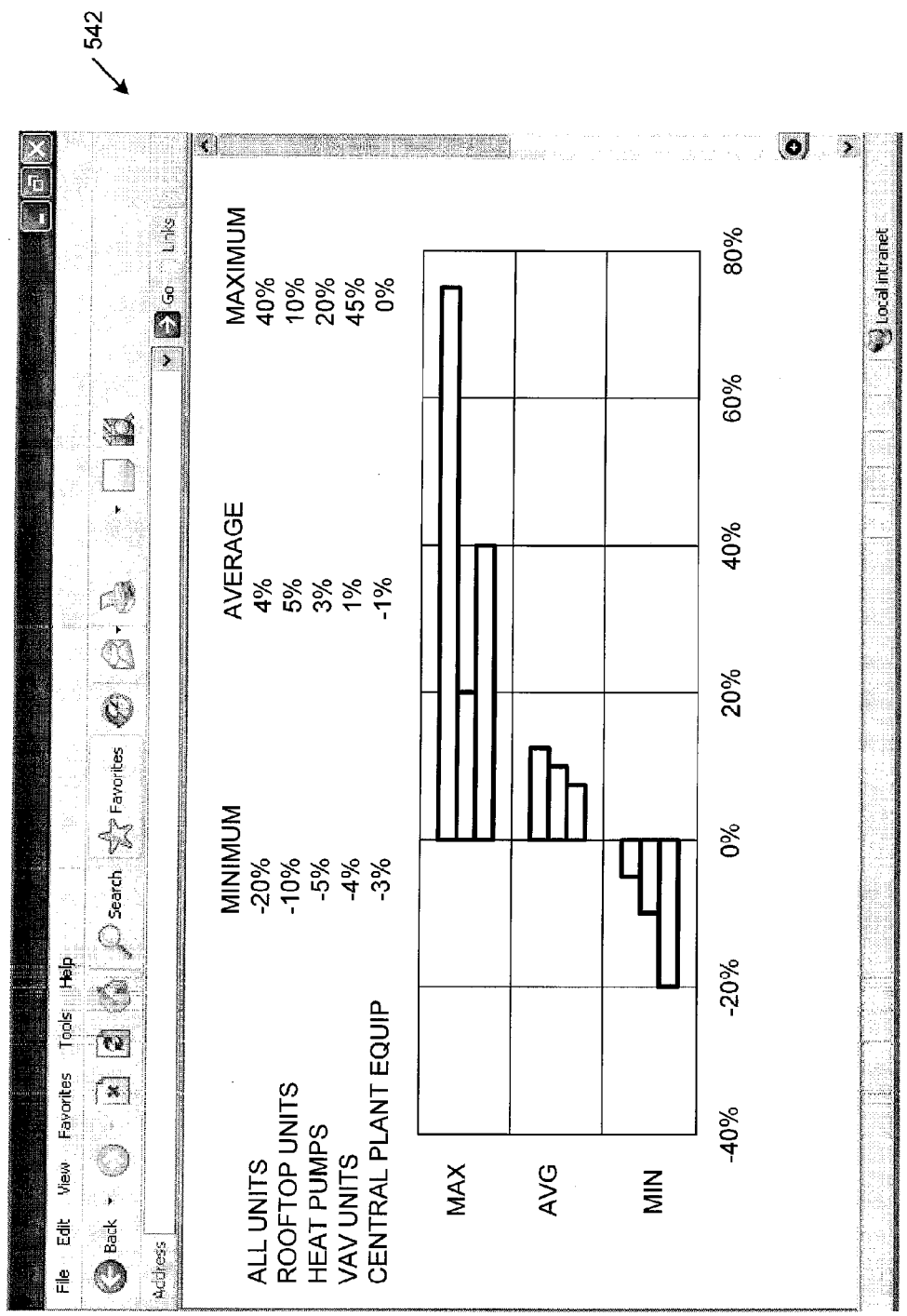
FIG. 14 is an exemplary user interface illustrating a plurality of efficiency percentages, similar to the user interface from FIG. 13.

FIG. 14 is an exemplary user interface illustrating a plurality of efficiency percentages, similar to the user interface from FIG. 13. As illustrated in the nonlimiting example of FIG. 14, performance asset optimization center 210 may be configured to receive data related to one or more assets and/or classes of assets in an environment (and/or plurality of environments). The performance asset optimization center 210 may be configured to compile this data to provide metrics associated with the operation of these asset(s). The performance asset optimization center 210 may provide a user interface 542 that is configured to provide an asset efficiency scorecard, which may include data related to asset efficiency gains and losses. More specifically, the percentage increase and/or decrease of asset efficiency can be measured. In this nonlimiting example, all units for this client have a minimum efficiency increase of −20%. The average for all units is an increase of 4%, while the maximum increase is 40%. For rooftop units, the minimum efficiency increase is −10%. The average is 5%, while the maximum is 10%. Similar percentages are calculated for heat pumps, Variable Air Volume (VAV) units, and central plane equipment.

Figure 15:
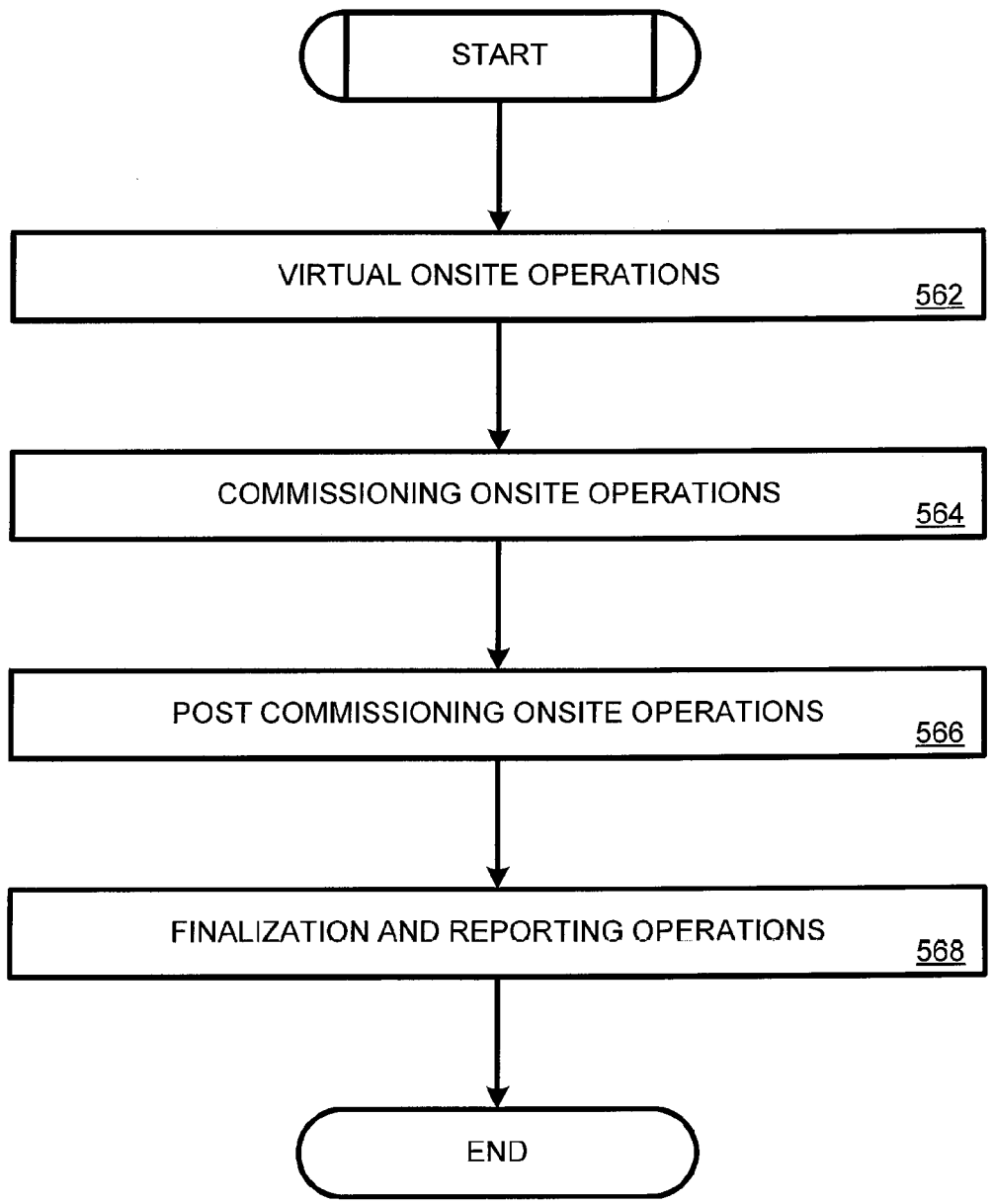
FIG. 15 is a flowchart illustrating an exemplary process that may be utilized for an environment, such as the environment from FIG. 2.

FIG. 15 is a flowchart illustrating a nonlimiting exemplary process that may be utilized for an environment, such as the environment from FIG. 2. As illustrated in the nonlimiting example of FIG. 15, performance assessment and optimization center 210 can perform virtual onsite operations (block 562). More specifically, as discussed in more detail below, upon initializing service, performance assessment and optimization center 210 can perform one or more tests to and/or on one or more of the client's assets. These tests can be performed in a virtual manner, such that a technician need not physically visit the asset. In addition to virtual onsite operations, onsite operations can also be commissioned (block 564). As discussed in more detail below, onsite operations may be commissioned in addition to (or in substitution for) the virtual onsite operations. Onsite operations can include operations that a technician physically performs to one or more asset.

After the onsite and/or virtual onsite operations are commissioned, post commissioning of onsite operations may be performed (block 566). Post commissioning of onsite operations can include initiating operation of the performance assessment and optimization center 210. Finalization and reporting of operations (block 568) can also be performed.

Figure 16:
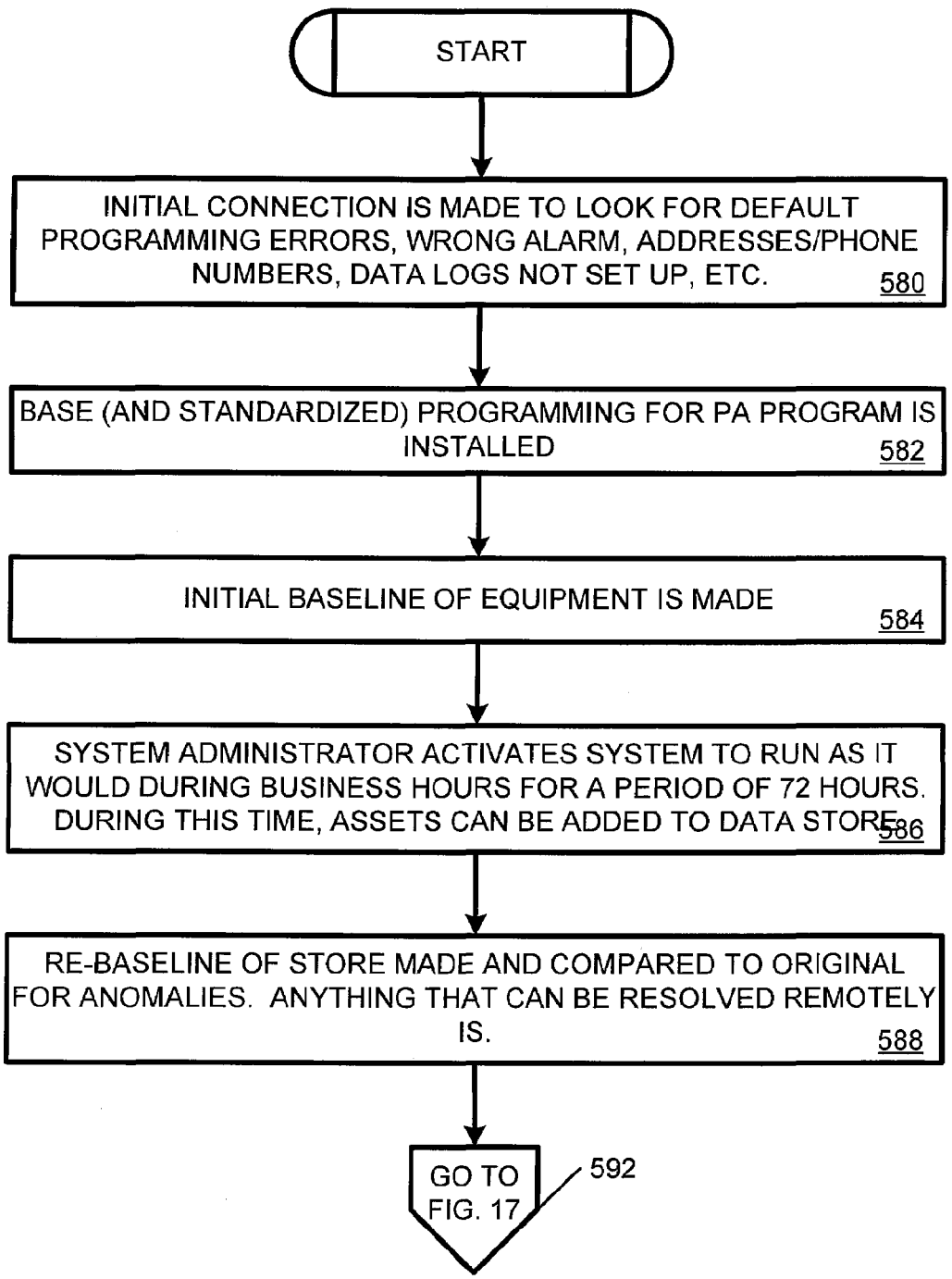
FIG. 16 is a flowchart illustrating an exemplary process that may be utilized in conducting virtual onsite operations, similar to the flowchart from FIG. 15.

FIG. 16 is a flowchart illustrating an exemplary process that may be utilized in conducting virtual onsite operations, similar to the flowchart from FIG. 15. As illustrated in the nonlimiting example of FIG. 16, virtual onsite commissioning can include (as a nonlimiting example) making an initial connection in search for default programming errors, incorrect alarms, addresses, telephone numbers, the absence of data logs, and/or other incorrect settings (block 580). Next, base (and standardized) programming for a performance assurance application may be installed (block 582). An initial baseline of equipment may then be made (block 584). The system can then be activated to run as if in actual operation (block 586). This test run can take place for any length of time, but may last 72 hours as according to at least one nonlimiting example. During this test run, assets can be added to data store (block 586). A re-baseline of the environment may then be made and compared to the original baseline (as performed in block 584) for anomalies. Problems that can be resolved remotely may be, therefore, solved remotely (block 588). The flowchart can then proceed to jump block 592.

Figure 17:
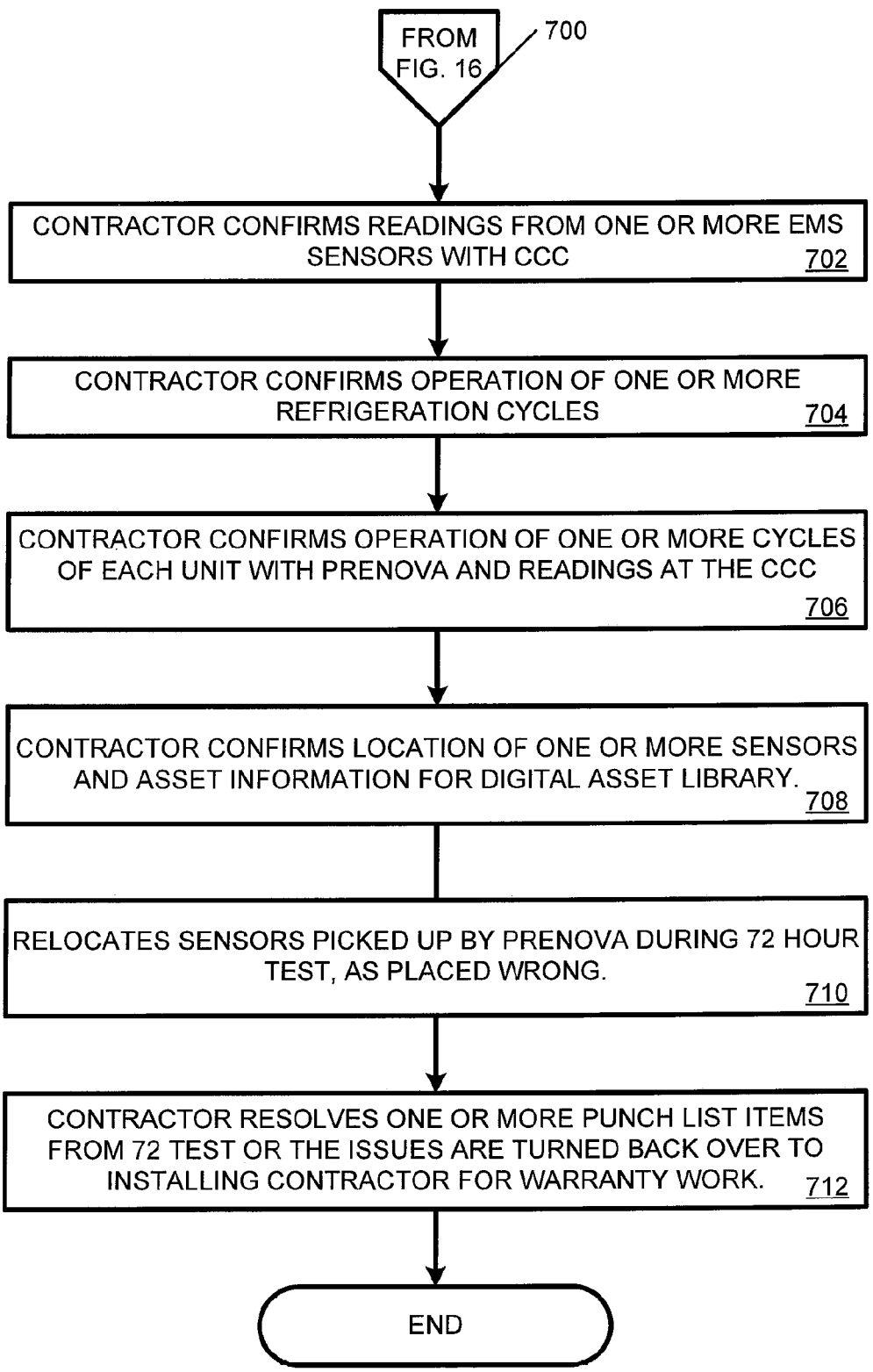
FIG. 17 is a continuation of the flowchart from FIG. 16.

FIG. 17 is a continuation of the flowchart from FIG. 16. As illustrated in the nonlimiting example of FIG. 17, from jump block 700 to block 702, a contractor can confirm readings from one or more sensors (not shown) associated with the Command Control Center (CCC). The contractor can then initialize one or more refrigeration cycle (block 704). The contractor can then confirm operation of one or more assets with a service provider and readings from the CCC (block 706). The contractor can then confirm location of one or more sensors (zone and/or duct mounted) and asset information for the digital asset library (block 708). The contractor may then reallocate sensors identified during test run (see above), as placed incorrectly (block 710). The contractor can then resolve one or more punch list items from test run and/or these issues are sent to installing contractor for warranty work (block 712). The process enables a contractor and/or system administrator to address issues associated with one or more asset and/or environment.

Figure 18:
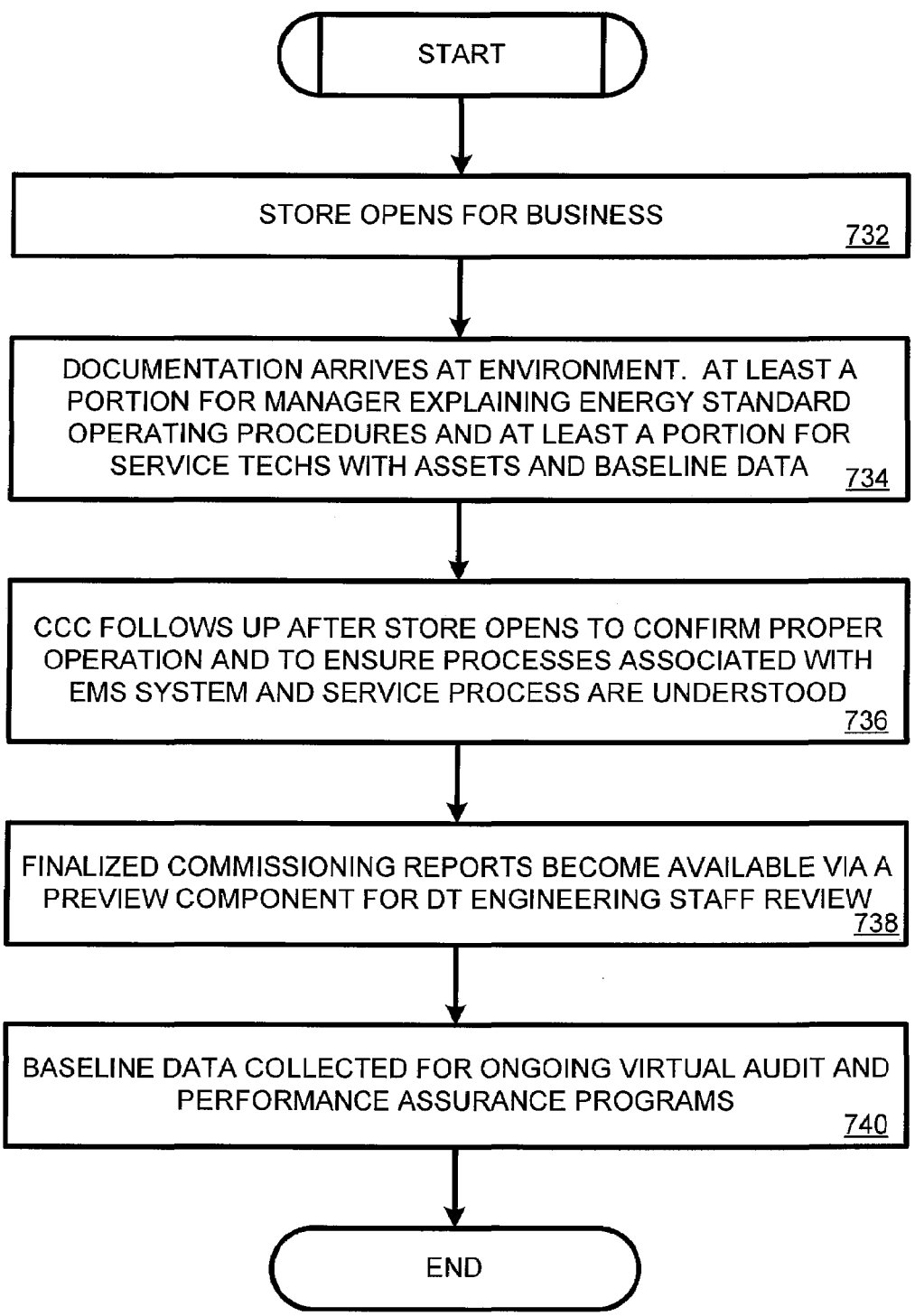
FIG. 18 is a flowchart illustrating an exemplary process that may be utilized in conducting post-commissioning onsite operations, similar to the flowchart from FIG. 17.

FIG. 18 is a flowchart illustrating an exemplary process that may be utilized in conducting post-commissioning onsite operations, similar to the flowchart from FIG. 15. As illustrated in the nonlimiting example of FIG. 18, post-commissioning onsite operations can include, as a nonlimiting example, a store (or other environment) opening for business (block 732). System documentation may arrive at an environment (the store). At least a portion of the documentation may explain, to store management, for example, energy standard operating procedures. Additionally, at least a portion of the documentation may explain, for service technicians, as an example, assets and baseline data (block 734). CCC can then follow-up after the store opens to confirm proper operation and to ensure processes associated with EMS system and service processes are understood (block 736). Finalized commissioning reports can then be provided via a preview component (block 738), which may be an application and/or physical component associated with the performance asset optimization center 210. Baseline data can then be collected for ongoing virtual audit and performance assurance programs (block 740).

Figure 19:
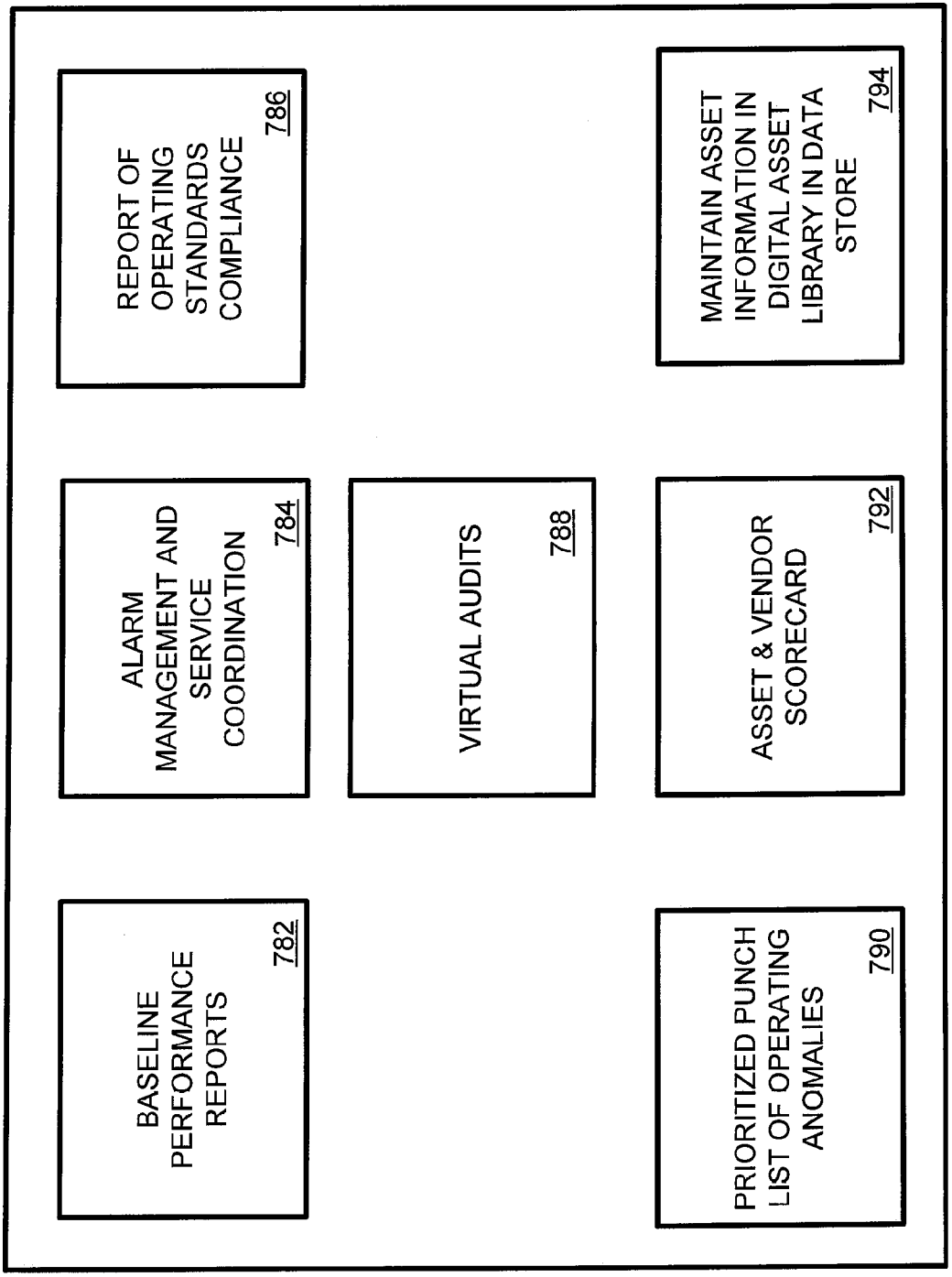
FIG. 19 is a block diagram illustrating exemplary processes that may be utilized for continuous commissioning of one or more assets, such as the assets from FIG. 2.

FIG. 19 is a block diagram illustrating exemplary processes that may be utilized for continuous commissioning of one or more assets, such as the assets from FIG. 2. As illustrated in the nonlimiting example of FIG. 19, continuous commissioning, which may occur during operation of the assets, can include a plurality of components. At least one embodiment may include providing base line performance reports 782, alarm management and service coordination 784, providing reports related to operating standards compliance 786, and virtual audit reports 788. Also included in FIG. 18, the system can provide prioritized punch lists of operating anomalies, provide asset and vendor scorecards 792, and maintain asset information in digital asset library in data store 794.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method for asset management, comprising:
   receiving, at an optimization center, data from at least one asset, the at least one asset being configured to service a remote environment;
   performing at least one calculation from the received data to determine whether the at least one asset is operating to a desired optimization; and
   providing an indication related to operation of the at least one asset, in response to a determination that the at least one asset is not operating properly, wherein providing an indication related to operation of the at least one asset includes providing information regarding a number of service calls made to the at least one asset.

2. The method of claim 1, further comprising sending a signal to the at least one asset in response to a determination that the at least one asset is not operating properly.

3. The method of claim 2, wherein sending a signal includes sending a command to facilitate proper operation of the at least one asset.

4. The method of claim 1, further comprising:
receiving data related to a plurality of assets that are configured to service the environment;
determining a desired operation parameter associated with the environment; and
determining whether the assets are operating properly in relation to the desired operation parameter associated with the environment.

5. The method of claim 4, further comprising, in response to determining that one or more of the assets are not operating properly in relation to the desired operation parameter associated with the environment, sending a command to at least one of the assets.

6. The method of claim 1, wherein providing an indication related to operation of the at least one asset includes providing a graphical user interface to a technician.

7. The method of claim 1, wherein providing an indication related to operation of the at least one asset includes providing a graphical user interface to a customer.

8. A system for asset management, comprising:
a data acquisition component, configured to receive data related to at least one asset, the at least one asset being configured to service at least one environment; and
a data management component coupled to the data acquisition component, the data management component configured to perform at least one algorithm on data received from the data acquisition component to determine whether the at least one asset is operating properly, where determining whether the at least one asset is operating properly includes determining a number of service calls made to the at least one asset,
wherein performance of the at least one algorithm is configured to determine whether the at least one asset is operating to a desired optimization.

9. The system of claim 8, further comprising a data store coupled to the data management component, the data store being configured to store at least a portion of data related to the at least one asset.

10. The system of claim 9, further comprising an asset optimization application coupled to the data store, the asset optimization application configured to provide at least one of the following: a proprietary algorithm, decision analytics, and a predictive algorithm.

11. The system of claim 9, further comprising a preview application coupled to the data store, the preview application configured to provide a user interface related to at least one asset.

12. The system of claim 8, wherein the data management component includes at least one of the following: a quality assurance algorithm, an audit algorithm, a validation algorithm, an estimation algorithm, a normalization algorithm, a rationalization algorithm, a units conversion algorithm, and a business operations rules algorithm.

13. The system of claim 8, further comprising a program configured to identify environment and asset conditions that are not in compliance with an established operating standard.

14. The system of claim 8, wherein the at least one asset includes at least one of the following: an air conditioner, a heater, a heating, ventilation, and air conditioning (HVAC) system, a security system component, a fire alarm system component, an appliance, an electrical system component, and an electronics component.

15. A computer readable medium for asset performance optimization, that stores a program that, when executed by a computer, causes the computer to perform at least the following:
receive data related to at least one asset, the at least one asset being configured to service at least one environment; and
perform at least one algorithm on data from the data acquisition component to determine whether the at least one asset is operating properly, where determining whether the at least one asset is operating properly includes determining a number of service calls made to the at least one asset,
wherein performance of the at least one algorithm is configured to determine whether the at least one asset is operating to a desired optimization.

16. The computer readable medium of claim 15, the program further configured to cause the computer to store at least a portion of data related to the at least one asset.

17. The computer readable medium of claim 16, the program further configured to cause the computer to provide at least one of the following: a proprietary algorithm, decision analytics, and a predictive algorithm.

18. The computer readable medium of claim 16, the program further configured to cause the computer to provide analysis related to at least one asset.

19. The computer readable medium of claim 16, the program further configured to cause the computer to provide a user interface related to at least one asset.

20. The computer readable medium of claim 15, wherein the computer readable medium stores at least one of the following: a quality assurance algorithm, an audit algorithm, a validation algorithm, an estimation algorithm, a normalization algorithm, a rationalization algorithm, a units conversion algorithm, and a business operations rules algorithm.

* * * * *